W. S. NEIL.
VALVE HANDLE.
APPLICATION FILED MAR. 18, 1919.

1,343,086.  
Patented June 8, 1920.

WITNESSES

INVENTOR  
W. S. NEIL  
BY  
ATTORNEYS

UNITED STATES PATENT OFFICE.

WINFIELD SCOTT NEIL, OF MINOT, NORTH DAKOTA.

VALVE-HANDLE.

1,343,086.

Specification of Letters Patent.

Patented June 8, 1920.

Application filed March 18, 1919. Serial No. 283,348.

*To all whom it may concern:*

Be it known that I, WINFIELD S. NEIL, a citizen of the United States, and a resident of Minot, in the county of Ward and State of North Dakota, have invented a new and useful Valve-Handle, of which the following is a full, free, and exact description.

It is a well known fact that considerable difficulty has been experienced with regard to valve handles, and that numerous endeavors have been made to construct a valve handle which will fit almost any size of valve stem and may be detachably connected thereto. Further, valve stems often become broken and it is almost impossible to control a valve, except with a wrench of the "Stillson" type, which frequently cannot be used in view of its comparatively long handle, as valves are sometimes located in inaccessible places.

My invention aims to provide a valve handle which will fit any size of valve stem and may be permitted to remain upon such stem as a permanent factor, or in emergencies may be quickly detached therefrom and applied to another valve stem of different size.

My handle, in addition to the above advantages, is peculiarly adapted for application to valve stems which have become broken, and as the same does not occupy any more space than the original handle of the valve, no question as to the application of the handle may arise.

Referring to the accompanying drawings,—

Figure 1:
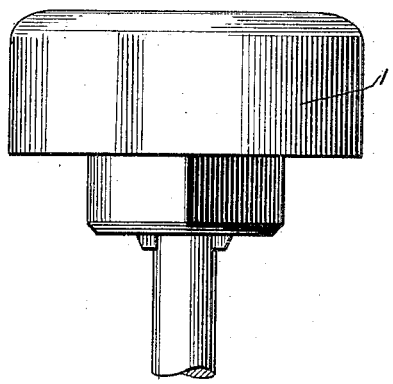
Figure 1 is a side elevational view.
Figure 2:
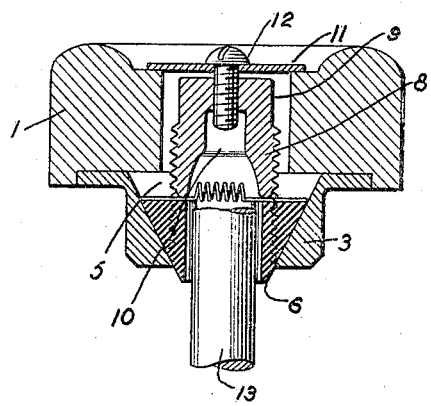
Fig. 2 is a sectional side elevation.
Figure 3:
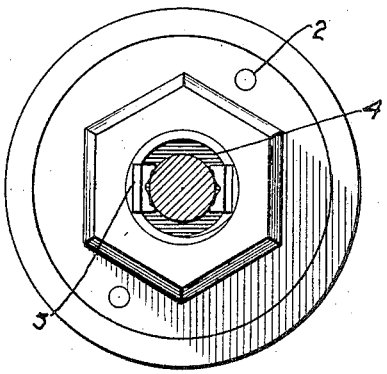
Fig. 3 is a bottom view.
Figure 4:
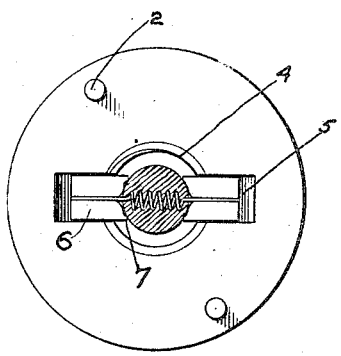
Fig. 4 is a top plan view with certain of the parts removed.

In the drawings the reference numeral 1 designates the handgrip, which may be of wood or other suitable material. Secured to such handgrip by means of lugs 2 is a main body member 3 provided with an interiorly screw-threaded opening 4, such screw threads being interrupted by grooves 5 at diametrically opposite points. The grooves, it will be noted, are of downwardly decreasing depth, and mounted within said grooves are wedge-shaped members 6 provided with gripping teeth 7 and a spring having its opposite ends connected to such wedge-shaped members for normally forcing the same apart. In this connection it is to be noted that the upper surface of the wedge-shaped members 6 are formed with shallow grooves permitting a seating of the ends of the spring in the same.

A screw-threaded rod 8 provided with a squared end 9 and a hollowed base portion 10, adapted to bridge the spring, engages the screw threads in the opening 4 and bears with its lower edges against the upper faces of the wedge members 6.

Any suitable form of retaining means for keeping the handgrip 1 in applied position with respect to the other parts of the apparatus may be resorted to, as for instance, a plate 11 and a screw 12 passing therethrough and into an opening in the head of the squared end of the rod 8.

In operation it will now be seen that considering the rod 13 as the broken valve stem, or valve stem from which the operating handle is missing, all that it will be necessary for the operator to do will be for him to revolve the rod 8 in an anti-clockwise direction by means of the squared end of the same subsequent to removing the blade 11, whereupon the lower edge of the same will become disengaged from the upper faces of the wedges and permit these members to ride upwardly in their grooves 5, by virtue of the spring. The handle may now be slipped over the projecting portion of the rod 13, so that the same projects into the screw-threaded opening 4 up to the spring between the wedge members. Upon the rod 8, now being rotated in clockwise direction, the wedges will be caused to move downwardly and by virtue of their jaws 7 to firmly engage the rod 13 and prevent any movement of the same with respect to the handle. The valve may now be turned, by means of the handgrip 1, at will; and to disengage the same from the rod 13, all that it is necessary to do is to reverse the operation above described. It will also be obvious that the blade 11 might entirely be dispensed with and the lugs 2 relied upon to insure the prevention of rotational movement of the handle 1 with respect to the body member 3.

Having now described my invention, what I desire to claim is:

1. A valve handle including a main body portion formed with an interiorly screw-threaded opening, and being further provided with grooves of gradually decreasing depth extending diagonally through the screw threads, wedges seated within said grooves, and a threaded rod engaging said screw threads and bearing against the upper faces of the wedges.

2. A valve handle including a main body portion formed with an interiorly screw-threaded opening, and being further provided with grooves of gradually decreasing depth extending diagonally through the screw threads, wedges mounted within such grooves, said wedges being connected together by means of a spring at their upper ends, and a threaded rod engaging the screw threads within the opening and being adapted to bear against the upper faces of the wedges, such rod having its base portion provided with a hollow for bridging such spring.

3. A valve handle including a handgrip, a main body portion secured to such handgrip, such main body portion being provided with an interiorly screw-threaded opening, together with grooves of gradually decreasing depth, wedges mounted in such grooves, a spring secured between the upper ends of the wedges, and a threaded rod engaging such screw threads being adapted to bear against the upper faces of the wedges, such rod having its base portion hollowed, so as to bridge the spring.

WINFIELD SCOTT NEIL.